US 6,766,342 B2

(12) United States Patent
Kechriotis (10) Patent No.: US 6,766,342 B2
(45) Date of Patent: Jul. 20, 2004

(54) SYSTEM AND METHOD FOR COMPUTING AND UNORDERED HADAMARD TRANSFORM (75) Inventor: George Kechriotis, Arlington, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 609 days.

(21) Appl. No.: 09/785,092

(22) Filed: Feb. 15, 2001

(65) Prior Publication Data

US 2002/0143835 A1 Oct. 3, 2002

(51) Int. Cl.[7] .............................................. G06F 17/14
(52) U.S. Cl. ........................................ 708/400; 708/410
(58) Field of Search ................................. 708/400, 410

(56) References Cited

U.S. PATENT DOCUMENTS 5,357,454 A * 10/1994 Dent .......................... 708/410
5,583,803 A * 12/1996 Matsumoto et al. ........ 708/401
6,587,590 B1 * 7/2003 Pan ............................ 382/250

OTHER PUBLICATIONS

F. Arguello et al., "Parallel Architecture for Fast Transforms with Trigonometric Kernel," IEEE Trans. on Parallel and Distributed Systems, vol. 5, No. 10, Oct. 1994, pp. 1091–1099.

Peceli, G., Feher, B.: "Digital Filters Based on Recursive Walsh–Hadamard Transformation," IEEE Trans. on Circuits and Systems, vol. CAS–37. No. 1. 1990, pp. 150–152.

Neungsoo Park and Viktor K. Prasanna, "Cache Conscious Walsh–Hadamard Transform," The 26th International Conference on Acoustics, Speech, and Signal Processing, (ICASSP), May 2001.

* cited by examiner

Primary Examiner—David H. Malzahn
(74) Attorney, Agent, or Firm—Meyertons Hood Kivlin Kowert & Goetzel, P.C.; Jeffrey C. Hood; Mark S. Williams (57) ABSTRACT A system and method for parallel computation of the unordered Hadamard transform. The computing system includes a plurality of interconnected processors and corresponding local memories. An input signal x is received, partitioned into $M_1$ sub-vectors $x_i$ of length $M_2$, and distributed to the local memories. Each processor computer a Hadamard transform (order $M_2$) on the sub-vectors in its local memory (in parallel), generating $M_1$ result sub-vectors $t_i$ of length $M_2$, which compose a vector t of length $M_1 \times M_2$. A stride permutation (stride $M_2$) is performed on t generating vector u. Each processor computes a Hadamard transform (order $M_1$) on the sub-vectors $u_j$ in its local memory (in parallel), generating $M_1$ result sub-vectors $v_j$ of length $M_2$, which compose a vector v of length $M_2 \times M_1$. A stride permutation is performed on v (stride $M_1$) generating result vector w, which is the Hadamard transform of the input signal x.

46 Claims, 7 Drawing Sheets

SYSTEM AND METHOD FOR COMPUTING AND UNORDERED HADAMARD TRANSFORM

FIELD OF THE INVENTION

The present invention relates to the field of digital signal processing, and more particularly to computation of an unordered Hadamard transform.

DESCRIPTION OF THE RELATED ART

A great variety of systems may be characterized by the property that they receive a signal and perform one or more mathematical operations on the received signal. Such signal processing is common in diverse fields such as telecommunications, wireless telecommunications, cryptography, filtering, data analysis, and others. Examples of such mathematical operations include the Fourier transform, the Walsh transform, the (ordered and unordered) Hadamard transform, and the Walsh-Hadamard transform, among others.

The Walsh transform is used in many areas such as image processing and digital communications as a fast way to compute an approximation of the FFT (Fast Fourier Transform). Lately it has found applications in cryptography and in testing the randomness of pseudo-random sequences. The latter application may require the computation of the Walsh transform for large 1 dimensional data sets (sometimes of the order of a 1 billion numbers or more).

Definition of Walsh Transform

The Walsh Transform of a sequence f(x), x=0, . . . ,N−1 is defined as:

$$W(u) = (1/N)\sum_{x=0}^{N-1} f(x) \prod_{l=0}^{n-1}(-1)^{b_i(x)b_{n-l-1}(u)} \quad (1)$$

where $b_i(x)$ denotes the $i^{th}$ bit of x, and n=log2(N).

Similarly, the inverse Walsh transform is defined as:

$$f(x) = \sum_{u=0}^{N-1} W(u) \prod_{l=0}^{n-1}(-1)^{b_i(x)b_{n-l-1}(u)} \quad (2)$$

The Hadamard Transform is similar to the Walsh transform and its transform matrix is actually a permutation of the Walsh transform matrix. The unordered Hadamard transform matrix may be constructed recursively for any length which is a power of 2, using a basic 2×2 matrix $H_2$ according to the relations:

$$H_2 = \begin{bmatrix} +1 & +1 \\ +1 & -1 \end{bmatrix} \quad (3)$$

$$H_4 = \begin{bmatrix} +H_2 & +H_2 \\ +H_2 & -H_2 \end{bmatrix}$$

$$H_{2N} = \begin{bmatrix} +H_N & +H_N \\ +H_N & -H_N \end{bmatrix}$$

For signal processing applications, the ordered Hadamard transform is primarily used:

$$H(u) = (1/N)\sum_{x=0}^{N-1} f(x)(-1)^{\sum_{l=0}^{N-1} b_i(x)b_i(u)} \quad (4)$$

$$f(x) = (1/N)\sum_{u=0}^{N-1} H(u)(-1)^{\sum_{l=0}^{N-1} b_i(x)b_i(u)} \quad (5)$$

It is noted that the Walsh and the ordered Hadamard transform are actually permutations of the unordered Hadamard transform, therefore once the unordered Hadamard transform has been computed, if the order of the results is important, they may be obtained by a simple reordering.

Mathematical operations such as these are typically performed on a received signal by a computer system with a single processor and memory (Von Neumann architecture). While this approach works well for small data sets (signals), the processing of much larger data sets may not be feasible due to time constraints.

To address the problems of processing large signals or data sets, algorithms have been developed for performing various signal processing operations via parallel computation systems, such as large matrix transpositions, for example. While a number of efficient methods for computation of the unordered Hadamard transform on a single CPU have been proposed, there are currently no known methods for parallel computation of the unordered Hadamard transform.

Thus, there exists a substantial need for a system and method for parallel computation of the unordered Hadamard transform.

SUMMARY OF THE INVENTION

Various embodiments of a system and method are presented for parallel computation of the unordered Hadamard transform. In the preferred embodiment, the method is performed by a computing system which includes a plurality of interconnected processors, each with a corresponding local memory. The method is presented in four stages for clarity.

In stage one, an input signal x is received and partitioned into a plurality of $M_1$ sub-vectors $x_i$, each having length $M_2$. Thus, the signal x comprises $M_1 \times M_2$ elements or values. The sub-vectors are then distributed to the local memories of the computing system. In other words, one or more of the sub-vectors $x_i$ are distributed or assigned to each processor/local memory.

Each processor may then compute a Hadamard transform (order $M_2$) on the one or more sub-vectors in its local memory. In the preferred embodiment, the processors compute their respective transforms in parallel. The transforms performed on the sub-vectors $x_i$ may generate a plurality of $M_1$ result sub-vectors $t_i$, each having length $M_2$, which compose a distributed result vector t of length $M_1 \times M_2$.

In the second stage of the method, elements of the result vector t may be collected with a stride of $M_2$ and placed into consecutively indexed locations in a second result vector u. In other words, a stride permutation may be performed on the result vector t (with stride $M_2$) to generate result vector u. Said another way, the vector t may be considered or interpreted as a distributed $M_1 \times M_2$ matrix, where each result sub-vector $t_i$ is viewed as a column (or row) of the matrix. A parallel matrix transposition is then performed, resulting in a transposed $M_2 \times M_1$ matrix, i.e., a matrix comprised of $M_2$ result sub-vectors $u_j$, each of length $M_1$.

In the third stage of the method, each processor may compute a Hadamard transform (order $M_1$) on the one or more result sub-vectors $u_j$ in its local memory. In the preferred embodiment, the processors compute their respective transforms in parallel. The transforms performed on the sub-vectors generate a plurality of $M_2$ result sub-vectors $v_j$, each having length $M_1$, which compose a distributed result vector v of length $M_2 \times M_1$.

In the fourth stage of the method, elements of the result vector v may be collected with a stride of $M_1$ and placed into consecutively indexed locations in a final result vector w. In other words, a stride permutation is performed on the result vector v (with stride $M_1$) to generate result vector w. Said another way, the vector v may be considered or interpreted as a distributed $M_2 \times M_1$ matrix, where each result sub-vector $v_j$ is viewed as a column (or row) of the matrix. A parallel matrix transposition is then performed, resulting in a transposed $M_1 \times M_2$ matrix, i.e., a matrix comprised of $M_1$ result sub-vectors $w_i$, each of length $M_2$. The ordered sub-vectors $w_i$ compose a distributed vector w, which is the unordered Hadamard transform of the input signal x.

It should be noted that if the order of elements of the final result is unimportant, then the last stage may be omitted, because only the order of the values changes.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
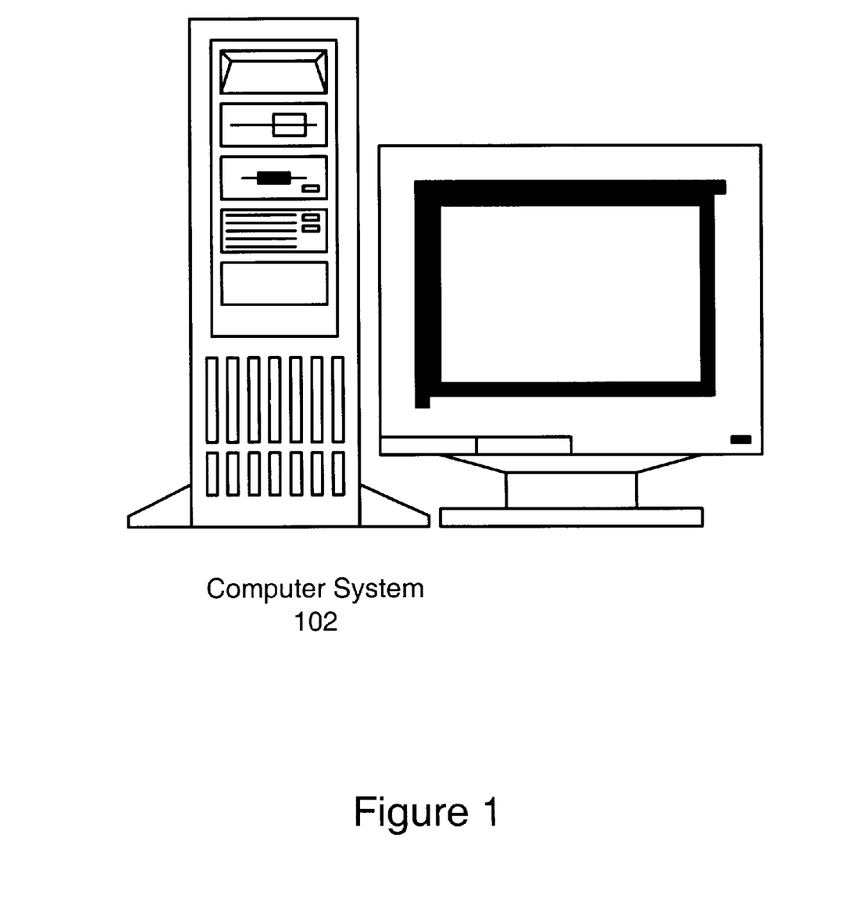
FIG. 1 illustrates a computer system, according to one embodiment.

FIG. 1—Computer System

FIG. 1 illustrates a computer system 102 which may be suitable for performing one embodiment of the invention. The computer system 102 may store and/or execute one or more software programs which perform the method described in FIGS. 4 and 7 below. In one embodiment, the computer system 102 may include at least one processor or CPU, a display device, such as a monitor, as well as a chassis and one or more I/O devices, such as a keyboard and/or mouse. Where the computer system 102 has a single CPU, the computing system is referred to as a Von Neumann machine. In another embodiment, the computer system 102 may include two or more processors, and may also include two or more memory mediums corresponding to the two or more processors. In the preferred embodiment, the computer system 102 includes a plurality of processors, preferably 2, 4, or 8 processors.

Figure 4:
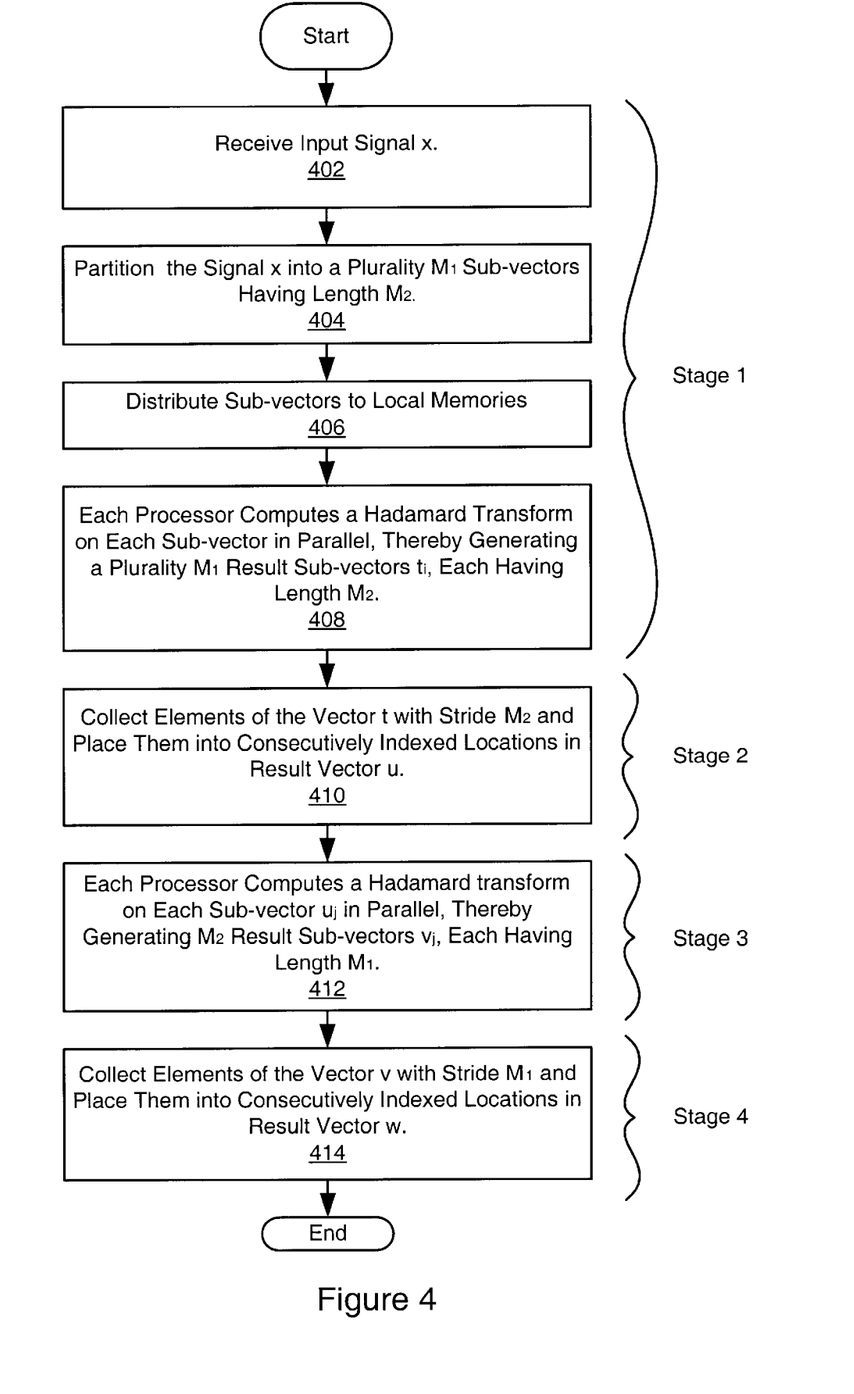
FIG. 4 is a flowchart of one embodiment of a method for parallel computation of a Hadamard transform.
Figure 7:
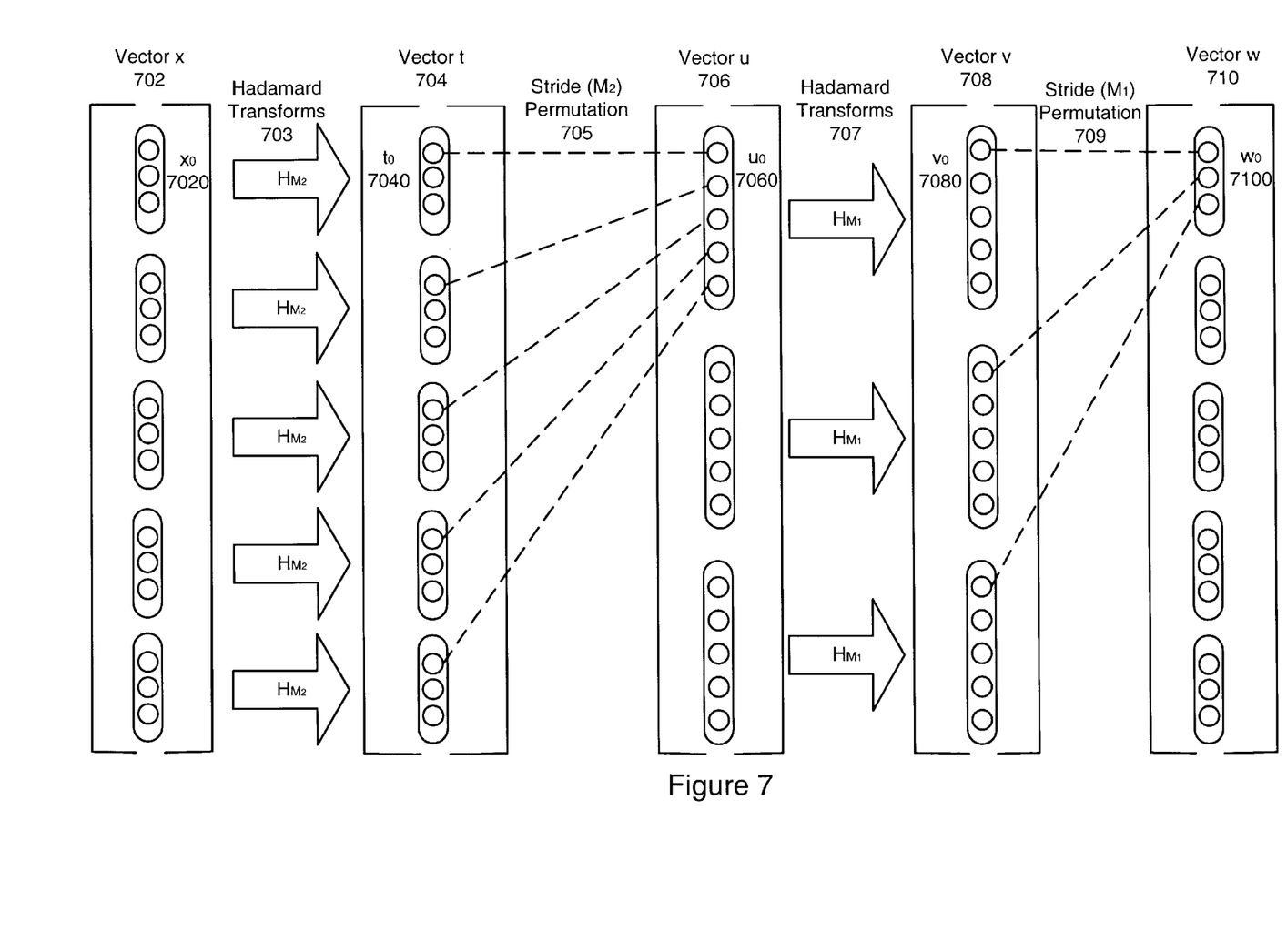
FIG. 7 illustrates the vector operations of the parallel Hadamard transform computation, according to one embodiment.

The computer system 102 may take any of various forms, such as a personal computer, a workstation, e.g., a Sun workstation, or any type of device which includes one or more processors that execute instructions from one or more memory mediums, or which includes programmable logic that has been configured to perform the methods described in FIGS. 4 and 7. Exemplary computer systems include a personal computer, workstation, mainframe computer, a personal computing device (PDA), television, digital signal processing system, embedded device, and other systems. Thus, as used herein, the term computer system is intended to encompass any of various devices which include one or more processors that can execute instructions from one or more memory mediums and/or may include one or more programmable logic devices that can be configured to execute a method or algorithm, such as that described in FIGS. 4 and 7.

The method of the present invention may be implemented in any of various types of devices and for any of various types of applications, such as described below with reference to FIGS. 2A–C.

Figure 2A:
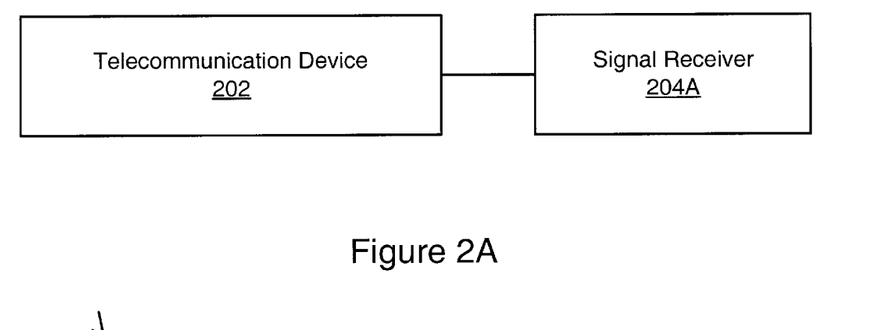
FIG. 2A is a diagram of a telecommunications system, according to one embodiment.
Figure 2B:
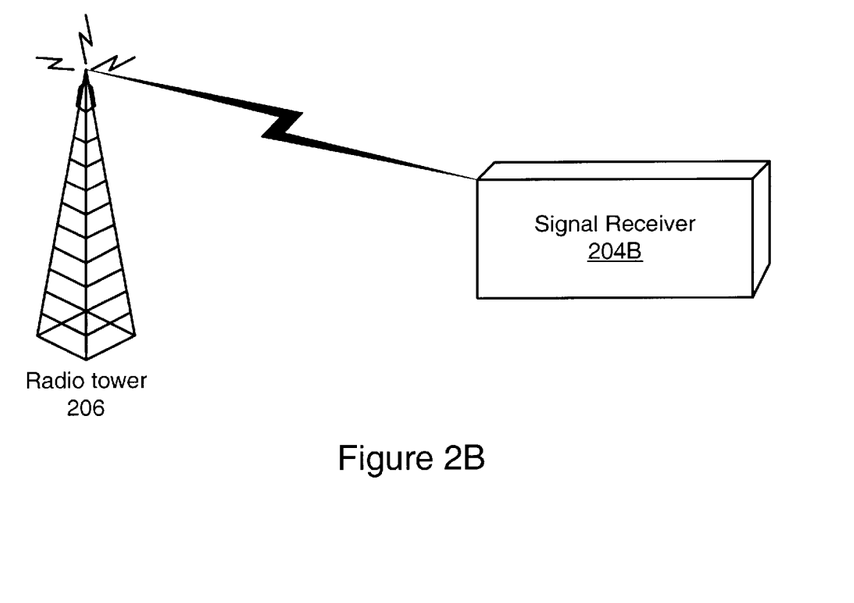
FIG. 2B is a diagram of a wireless telecommunications system, according to one embodiment.
Figure 2C:
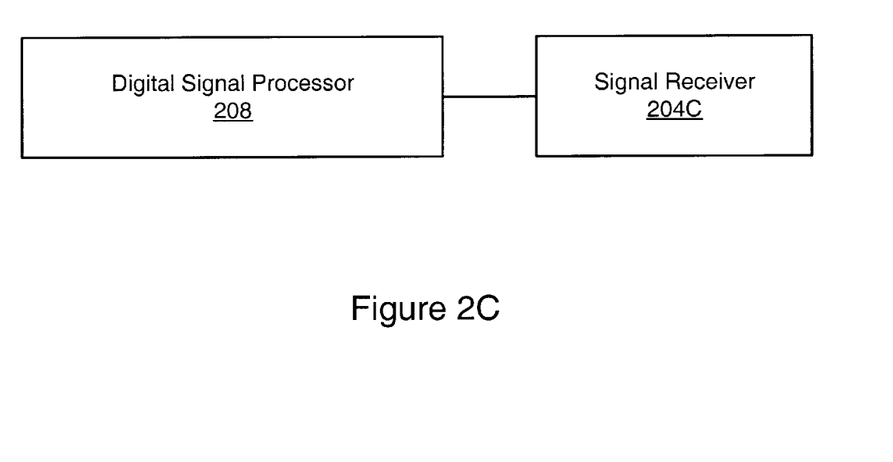
FIG. 2C is a diagram of a digital signal processing system, according to one embodiment.

FIGS. 2A–C—Applications of the Unordered Hadamard Transform

FIGS. 2A, 2B, and 2C illustrate various exemplary applications where the invention may be used. However, it is noted that the invention is not limited to these applications, but rather may be used in any of various applications. As FIGS. 2A and 2B show, the unordered Hadamard transform may be useful in the fields of both wired and wireless telecommunications. As FIG. 2A shows, in a wired telecommunication system a signal receiver 204A may be coupled to a telecommunication device 202, and may be operable to receive telecommunication signals and transmit the received signals to the telecommunication device 202. Various filtering or processing operations may be performed by one or both of the signal receiver 204A and the telecommunication device 202. Similarly, in a wireless telecommunication system, as shown in FIG. 2B, a signal receiver 204B may be operable to receive signals from a radio tower 206, and to apply various filtering and/or signal processing algorithms to the received signals. In these example applications, a computer system 102 comprised in or coupled to the signal receiver 204 may compute the parallel Hadamard transform described herein on the received signals to process the received signals and extract information from these signals or convert the signals to a different form for further processing. For example, the computer system 102 may perform the Hadamard transform on the received signals to determine a match from among a set of candidate signals.

A broad area of application of the present invention is digital signal processing, as shown in FIG. 2C. As FIG. 2C illustrates, a signal receiver 204C may be coupled to a digital signal processor (DSP) 208, and may be operable to receive a signal and to transmit the received signal to the DSP for processing. Signal processing operations, such as the unordered Hadamard transform, may be performed on the received signal by one or both of the signal receiver 204C and the DSP 208. For example, the DSP 208 may perform the parallel Hadamard transform described herein to extract information from the signal or convert the signal to a different form for further processing.

One common use of digital signal processing is in cryptography, where information is encoded in a signal so as to prevent unauthorized access to the information. In many cases, the information may be embedded in a random or pseudo-random numeric sequence. A user wishing to determine whether a given sequence (signal) contains a coded message may measure the randomness of the sequence and, if the sequence is found to be less random than expected, the presence of an embedded message may be assumed. One manner of determining if the sequence is non-random is to search for repeating values. The unordered Hadamard transform is particularly suitable for this task in that the transform calculates the sum and difference for all possible pairings of each of the values in the signal. A zero result for the difference calculation for a given pair implies that the two values are the same, and so a repetition has occurred.

In addition to the applications listed above, the method described herein may also be used in instrumentation systems, industrial automation or process control systems, telecommunication systems, financial systems, machine vision systems and any other application where it is desirable to perform an unordered Hadamard transform on a received signal. More specific applications wherein the method of the present invention may be used include digital signal processing in a telecommunication system, as well as analysis related to image data, measurement data, acoustic data, seismic data, financial data, stock data, futures data, business data, scientific data, medical data, insurance data, musical data, biometric data, and telecommunications signals, among others.

As mentioned above, the unordered Hadamard transform may be performed on relatively small data sets or signals via conventional computation techniques, i.e., via a standard Von Neumann machine, with relative ease. However, especially in cryptographic applications, input signals may comprise millions, or even billions, of values, thus rendering the task of performing the unordered Hadamard transform on the signal intractable, or at least unfeasible, for a Von Neumann (single processor) machine. In these cases, a parallel computation system, such as that described below with reference to FIG. 3, may be used to implement various embodiments of the present invention.

Figure 3:
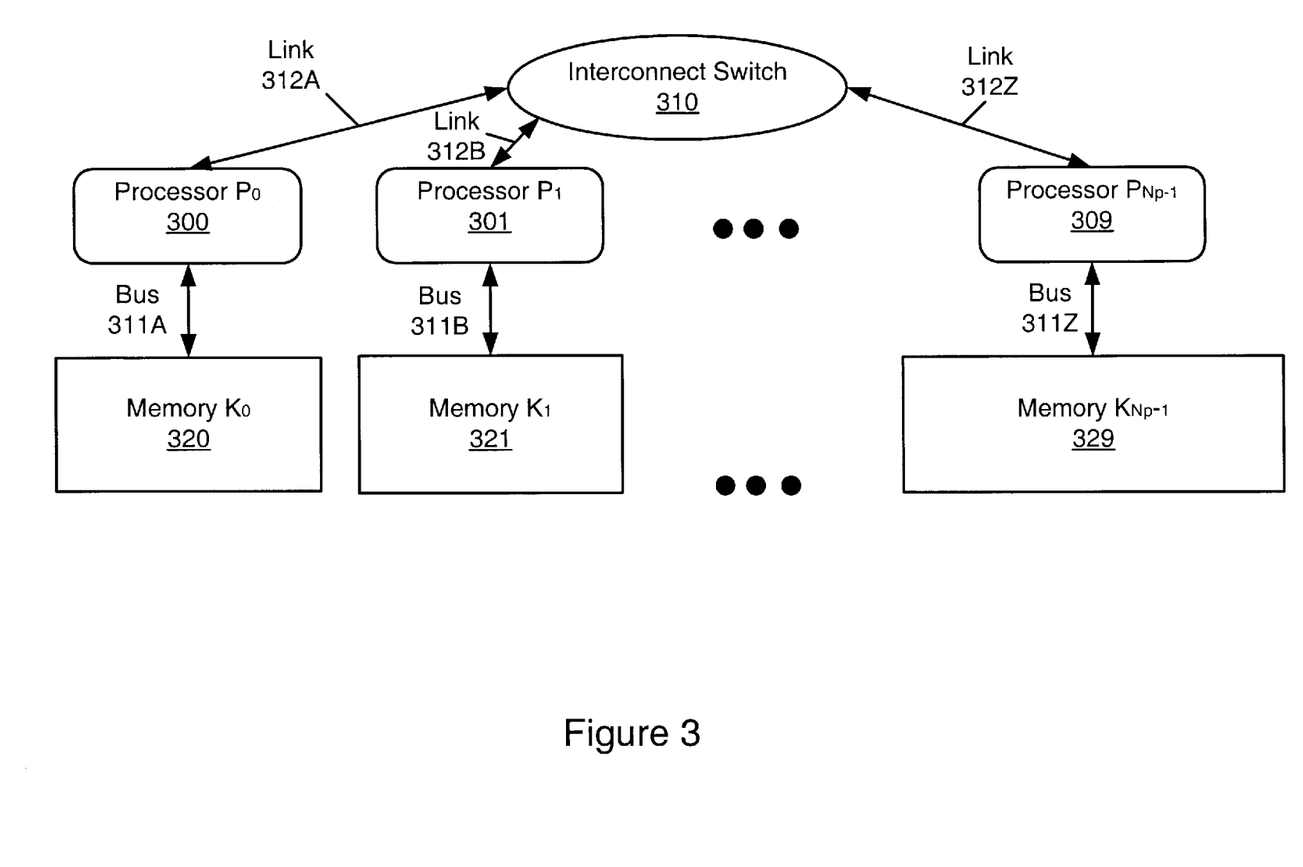
FIG. 3 illustrates a parallel computer system which may be suitable to perform a method according to one embodiment of the present invention.

FIG. 3—A Parallel Computing System

FIG. 3 is a diagram of a parallel computing system, according to one embodiment. As FIG. 3 shows, in one embodiment, a plurality of processors, $P_0$ 300, $P_1$ 301, . . . , $P_{Np-1}$ 309 are respectively coupled to each of a corresponding plurality of local memory mediums $K_0$ 320, $K_1$ 321, . . . , $K_{Np-1}$ 329, via corresponding buses 311A–Z. Note that for simplicity, substantially similar components may be referred to collectively by a single number, e.g. buses 311A, 311B, . . . , 311Z may be referred to simply as 311.

As FIG. 3 also shows, each processor P may be coupled to an interconnect switch 310 via a link 312, thereby enabling each processor to communicate and exchange data with each of the other processors. In one embodiment, the parallel computing system may be comprised in a single unit, such as the computer system 102 described above with reference to FIG. 1, wherein the single unit includes two or more processors and corresponding local memory mediums. In another embodiment, the parallel computing system may comprise two or more coupled computers, wherein each computer includes one or more processors and corresponding local memory mediums, and wherein each computer is directly coupled to each of the other computers. In yet another embodiment, the parallel computing system may comprise a plurality of computers coupled over a network, such as the Internet, wherein each computer includes one or more processors and corresponding local memory mediums.

Thus, the present invention may be implemented in various computer systems, including multi-processor computers and networked computers, including both LAN and WAN distributed computing systems.

Theory

Tensor Product Formulation of the Unordered Hadamard Transform

The tensor product of a vector x of length M:

$$x = \begin{bmatrix} x_0 \\ \vdots \\ x_{M-1} \end{bmatrix}$$

with a vector y of length N, is defined as a vector z of length M *N:

$$z = x \otimes y = \begin{bmatrix} x_0 y \\ \vdots \\ x_{M-1} y \end{bmatrix} \qquad (6)$$

The tensor product of an M×M matrix A and an N×N matrix B, is the MN×MN matrix C:

$$C = A \otimes B = \begin{bmatrix} a_{0,0}B & \cdots & a_{0,M-1}B \\ \vdots & \ddots & \vdots \\ a_{M-1,0}B & \cdots & a_{M-1,M-1}B \end{bmatrix} \qquad (7)$$

Using the above notation, it is clear that equation (3) can be rewritten as:

$$H_2 = \begin{bmatrix} +1 + 1 \\ +1 - 1 \end{bmatrix}$$

$$H_4 = H_2 \otimes H_2$$

$$H_{2N} = H_2 \otimes H_N \qquad (8)$$

An important property of the tensor product is the factorization:

$$A \otimes B = (A \otimes I_N) \cdot (I_M \otimes B) = (I_M \otimes B) \cdot (A \otimes I_N) \qquad (9)$$

where $I_M$ and $I_N$ denote the identity matrices of order M and N correspondingly.

An L-point stride N permutation matrix P (L,N), where L=M·N, is defined by:

$$P(L,N)(x \otimes y) = y \otimes x$$

where x and y are vectors of length M and N.

An important theorem relating stride permutations and tensor products is that for matrices A of size M×M and B of size N×N:

$$P(MN,N)(A \otimes B) = (B \otimes A)P(MN,N) \qquad (10)$$

Moreover, the inverse of a permutation matrix P (MN, N) is given by the identity:

$$P(MN, N)^{-1} = P(MN,M) \qquad (11)$$

Derivation of the Parallel Algorithm

Assume the computation of the unordered Hadamard transform of a vector x of length M is to be computed. M is a power of 2, i.e. $M=2^n$, for some integer n. The computation of the transform is equivalent to the following matrix-vector product:

$$y = H_M \cdot x \qquad (12)$$

Assume that n can be decomposed as the sum of two integers $n_1$ and $n_2$: $n=n_1+n_2$. Equivalently, the length of the input vector x can be expressed as:

$$M=M_1 * M_2 = 2^{n_1} * 2^{n_2}$$

Using Eq. (8), we can rewrite Equation (12) as:

$$y = \underbrace{(H_2 \otimes) \ldots \otimes H_2 \otimes}_{n_1 \text{ factors}} \underbrace{(H_2 \otimes) \ldots \otimes H_2) x}_{n_2 \text{ factors}} = (H_2^{n_1} \otimes H_2^{n_2}) x = (H_{M1} \otimes H_{M2}) x \quad (13)$$

Using Equation (9), we can rewrite Equation (13) as:

$$y = (H_{M1} \otimes I_{M2}) \cdot (I_{M1} \otimes H_{M2}) x \quad (14)$$

Moreover, using Equations (10) and (11) we rewrite Equation (14) as:

$$y = (H_{M1} \otimes I_{M2}) \cdot (I_{M1} \otimes H_{M2}) x \quad (15)$$
$$= P(M_1 M_2, M_1) \cdot (I_{M2} \otimes H_{M1}) \cdot P(M_1 M_2, M_1)^{-1} \cdot (I_{M1} \otimes H_{M2}) x$$
$$= P(M_1 M_2, M_1) \cdot (I_{M2} \otimes H_{M1}) \cdot P(M_1 M_2, M_2) \cdot (I_{M1} \otimes H_{M2}) x$$

Equation (15) is the basis of our parallel algorithm. The vector x of length $M_1 M_2$ is being partitioned as $M_1$, consecutive segments of length $M_2$.

$$x = \begin{bmatrix} x_0 \\ \vdots \\ x_{M-1} \end{bmatrix}$$

From Equation (15), we see that the unordered Hadamard transform can be computed as a sequence of 4 stages:
Stage 1: Compute $t=(I_{M1} \otimes H_{M2}) \cdot x$
$(I_{M1} \otimes H_{M2}) \cdot x$ can be expanded to:

$$(I_{MI} \otimes H_{M2}) \cdot x = \begin{bmatrix} H_{M2} & \cdots & 0 \\ \vdots & \ddots & \vdots \\ 0 & \cdots & H_{M2} \end{bmatrix} * \begin{bmatrix} x_0 \\ \vdots \\ x_{M-1} \end{bmatrix} = \begin{bmatrix} H_{M2} x_0 \\ \vdots \\ H_{M2} x_{M-1} \end{bmatrix} \quad (16)$$

Equation (16) shows that the first stage can be computed as $M_1$ independent transforms of size $M_2$, each being performed on a different subvector of the partitioned input vector x.

Figure 5:
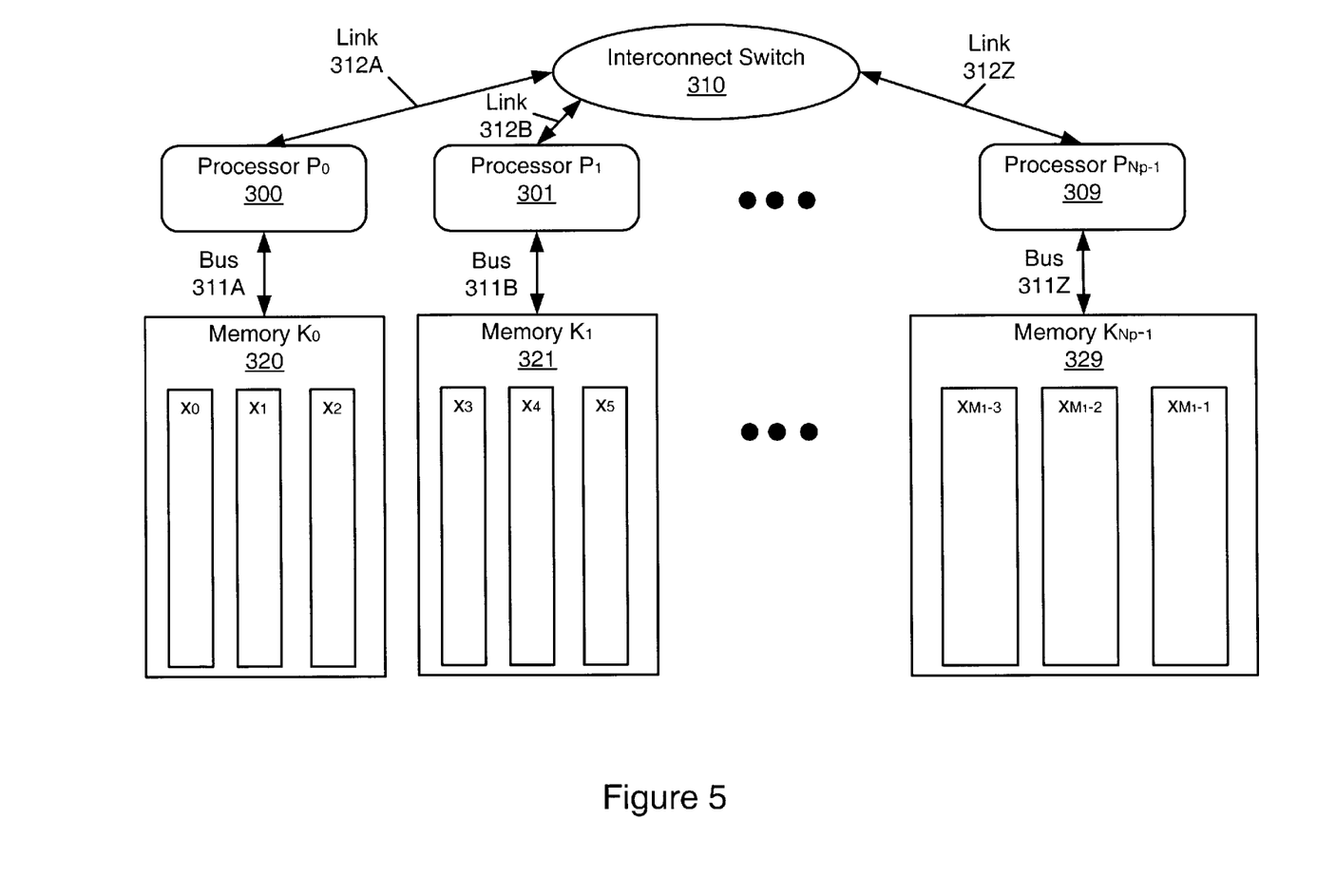
FIG. 5 is a block diagram of the parallel computing system of FIG. 3 performing parallel Hadamard transforms, according to one embodiment.

In a distributed memory multiprocessor system with $N_p$ processors $P_0, P_1, \ldots, P_{np-1}$, each with each local memory, the partitioned input vector x may be stored in the local memory of each processor in contiguous segments of length $M_2$, as shown in FIG. 5, described below.

Every processor computes transforms of length $M_2$ of its locally stored x segments by loading the data into its registers performing the appropriate computations and then writing the results back into its local memory. The interconnect network is not utilized during this stage, and the speedup is approximately equal to the number of connected processors. (It can be less, if $M_1$ is not exactly divisible by the $N_p$, in which case some processors will process less segments than others, resulting in load imbalance).

Stage 2: Compute: $u = P(M_1 M_2, M_2) \cdot t$

Vector t is a distributed vector of length $M_1 M_2$. The stride permutation $P(M_1 M_2, M_2)$, collects elements of the vector t with stride $M_2$ and places them into consecutively indexed locations in the result vector u. In particular, every processor collects the first element of every local segment $t_1$, (it is assumed that the elements of the vector t have replaced that of the original vector x and are placed into the corresponding segments within the local memory of each processor) and sends them to the processor which will hold segment $u_0$. Each such segment will now be of length $M_1$ and will be placed in the local memory of a processing element.

Next, the second element of each segment of length $M_2$ is picked by every processor, and the resulting vector of length $M_1$ is sent to the processor which will hold that segment and so on.

Thus, to assemble every single segment of length $M_1$, elements from all $M_2$-length segments are required, and since these are located in the local memory of different processors, a global communication operation is required during this stage, in which all processors send and receive appropriate data via the interconnect network.

This is a communication intensive stage, and its speed generally depends on the bi-directional bandwidth of the links connecting the processors to the interconnect switch and on the speed and capacity of the switch. As it will however become clear shortly this stage is equivalent to a global transposition of a 2D array of size $M_2 \times M_1$ into an array of size $M_1 \times M_2$, and therefore efficient methods for global matrix transposition can be used.

We may consider the vector t of length M as a 2D array of size $M_2 \times M_1$. Assuming that elements whose first index in this array varies faster are stored in consecutive memory locations (Fortran multi-dimensional array storage convention), subvectors of length $M_2$ will be placed in the memory one after the other. Since the 2 D array is distributed over the local memories of each processor, every processor will hold a set of such subvectors. This is exactly the memory layout used for storing the distributed 1 D vector t. Similarly, the resulting vector u may also be thought of as a 2D array of size $M_1 \times M_2$, and therefore stage 2 is effectively a parallel 2D matrix transposition.

At the beginning of stage 2, the input and result vectors t and u are aliased into 2 D arrays. Then a parallel 2D array transposition is performed. Finally the 2D result array is aliased back into an vector of length M. The parallel transposition is performed via a method suitable for the speed of the interconnect, the number of processors and the size of the 2D arrays.

Figure 6:
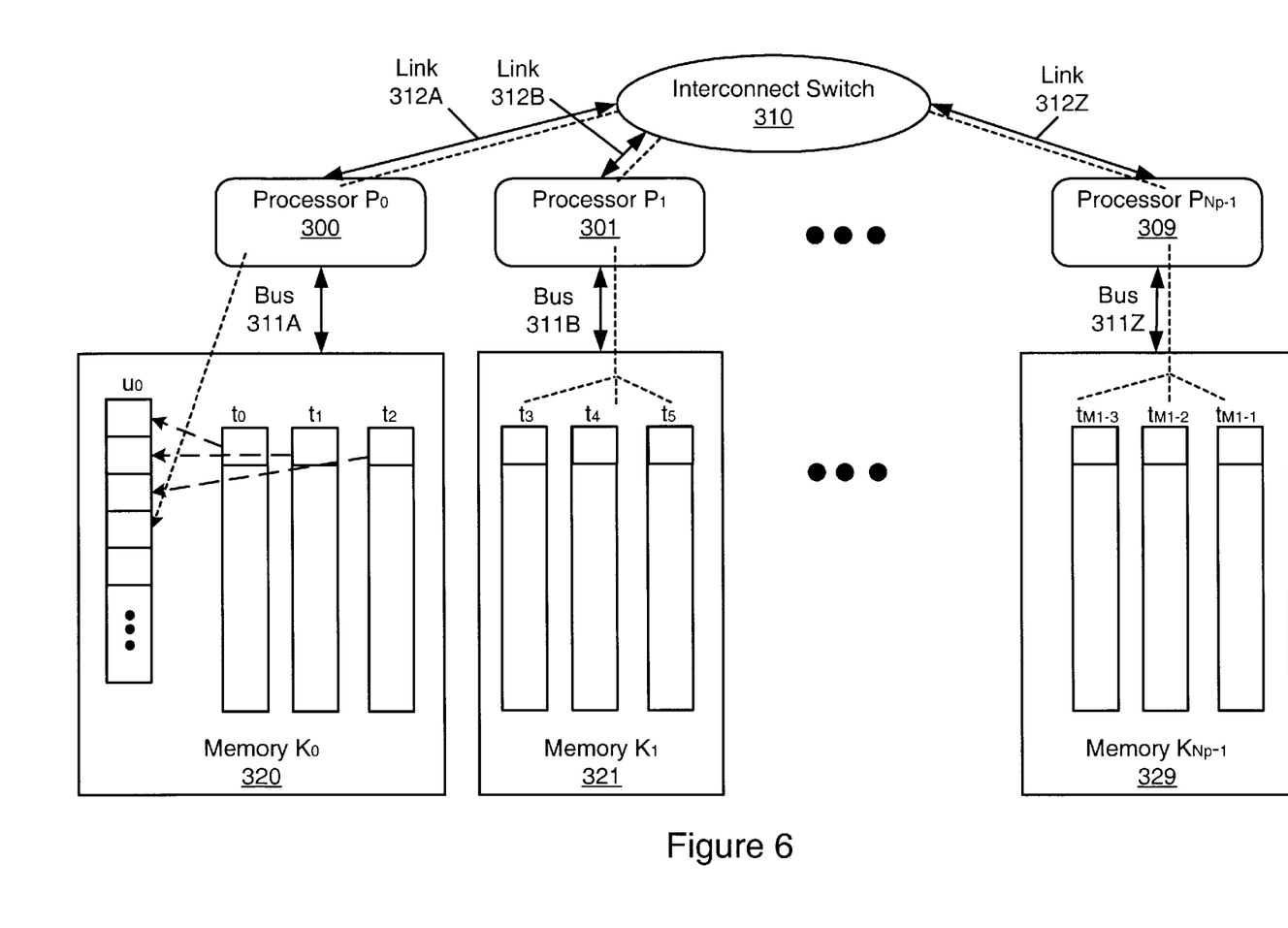
FIG. 6 is a block diagram of the parallel computing system of FIGS. 3 and 5 performing a stride permutation, according to one embodiment.

A new $M_1$-length segment of the result vector u is formed in the local memory of processor $P_0$ by gathering the first element of every length $M_2$ segment from every processor, as shown in FIG. 6, described below.

Stage 3: Compute $v = (I_{M2} \otimes H_{M1}) \cdot u$

Similarly to stage 1, $(I_{M2} \otimes H_{M1}) \cdot u$ can be expanded to:

$$(I_{M2} \otimes H_{MI}) \cdot u = \begin{bmatrix} H_{M_1} & \cdots & 0 \\ \vdots & \ddots & \vdots \\ 0 & \cdots & H_{M_1} \end{bmatrix} * \begin{bmatrix} u_0 \\ \vdots \\ u_{M_2-1} \end{bmatrix} = \begin{bmatrix} H_{M_1} u_0 \\ \vdots \\ H_{M_1} u_{M_2-1} \end{bmatrix}$$

During this stage, $M_2$ independent transforms of length $M_1$ are being computed. Every processor retrieves data from its local memory, computes their unordered Hadamard transform of length M1 and then stores them back into its local memory. The computation during this stage is very similar to that described with reference stage 1, above.

Stage 4: Compute: $w = P(M_1 M_2, M_1) \cdot v$

Again, similarly to stage 2, this computation is performed as a global 2D matrix transposition of an array of size $M_1 \times M_2$ to an array of size $M_2 \times M_1$. Note that if only the value of the resulting transform is important and the order of its elements can be ignored, as it is common in many applications, this last stage may be omitted, since the numerical values of any of the three Hadamard (or Walsh) transform variations we described in Section 1, have already been computed at the end of stage 3.

A detailed descriptions of one embodiment of the process described above are presented below with reference to FIGS. 4–7.

FIG. 4—Parallel Computation of the Hadamard Transform

FIG. 4 flowcharts one embodiment of a method for parallel computation of the unordered Hadamard transform of a received signal x. In the preferred embodiment, the method is performed by a computing system which includes a plurality of processors, each with a corresponding local memory. The method is presented in four stages (as described above) for clarity. The first stage includes 402–408.

As FIG. 4 shows, in 402 an input signal x may be received. In 404, the signal x may be partitioned into a plurality of $M_1$ sub-vectors $x_i$, each having length $M_2$. Thus, the signal x comprises $M_{1 \times M2}$ elements or values.

Then, in 406 the sub-vectors may be distributed to the local memories of the computing system. In other words, one or more of the sub-vectors $x_i$ may be distributed or assigned to each processor/local memory.

In 408, each processor computes a Hadamard transform (order $M_2$) on the one or more sub-vectors in its local memory. In the preferred embodiment, the processors compute their respective transforms in parallel. The transforms performed on the sub-vectors $x_i$ generate a plurality of $M_1$ result sub-vectors $t_i$, each having length $M_2$, which compose a distributed result vector t of length $M_1 \times M_2$.

Step 410 comprises the second stage of the method. In 410, elements of the result vector t may be collected with a stride of $M_2$ and placed into consecutively indexed locations in a second result vector u. In other words, a stride permutation may be performed on the result vector t (with stride $M_2$) to generate result vector u. Said another way, the vector t may be considered or interpreted as a distributed $M_1 \times M_2$ matrix, where each result sub-vector $t_i$ may be viewed as a column (or row) of the matrix. A parallel matrix transposition may then be performed, resulting in a transposed $M_2 \times M_1$ matrix, i.e., a matrix comprised of $M_2$ result sub-vectors $u_j$, each of length $M_1$.

Step 412 comprises the third stage of the method. In 412, each processor computes a Hadamard transform (order $M_1$) on the one or more result sub-vectors $u_j$ in its local memory. In the preferred embodiment, the processors compute their respective transforms in parallel. The transforms performed on the sub-vectors generate a plurality of $M_2$ result sub-vectors $v_j$, each having length $M_1$, which compose a distributed result vector v of length $M_2 \times M_1$.

Step 414 comprises the fourth stage of the method. In 414, elements of the result vector v may be collected with a stride of $M_1$ and placed into consecutively indexed locations in a final result vector w. In other words, a stride permutation may be performed on the result vector v (with stride $M_1$) to generate result vector w. Said another way, the vector v may be considered or interpreted as a distributed $M_2 \times M_1$ matrix, where each result sub-vector $v_j$ may be viewed as a column (or row) of the matrix. A parallel matrix transposition may then be performed, resulting in a transposed $M_1 \times M_2$ matrix, i.e., a matrix comprised of $M_1$ result sub-vectors $w_i$, each of length $M_2$. The ordered sub-vectors $w_i$ compose a distributed vector w, which is the Hadamard transform of the input signal x.

It should be noted that if the order of elements of the final result is unimportant, then the last step 414 may be omitted, because only the order of the values changes. As mentioned above, because the unordered Hadamard transform is a permutation of a number of other transforms, e.g., the ordered Hadamard transform, the Walsh transform, etc., these other transforms may be produced by further ordering of the values.

FIG. 5—Block Diagram of Parallel Computing System Performing Parallel Hadamard Transforms FIG. 5 illustrates the performance of the parallel Hadamard transforms, described in 408 above, by the parallel computing system described above with reference to FIG. 3. As described above, each of the plurality of processors, $P_0$ 300, $P_1$ 301, ..., $P_{Np-1}$ 309 may be respectively coupled to each of the corresponding plurality of local memory mediums $K_0$ 320, $K_1$ 321, ..., $K_{Np-1}$ 329, via corresponding buses 311A–Z. Furthermore, each processor P may be coupled to interconnect switch 310 via respective link 312, enabling each processor to communicate and exchange data with each of the other processors, although this aspect of the system is not used in this stage.

As FIG. 5 shows, the input vector x (received in 402 above) may be distributed among the respective local memory mediums of each processor P in the form of sub-vectors $x_i$ (in 404 above). For illustration purposes, each local memory is shown containing three sub-vectors of x, although the actual number of sub-vectors in each local memory may be different. As described in 408 above, in this embodiment, each processor computes a Hadamard transform (order $M_2$) on the three sub-vectors in its local memory. Because each transform may be performed independently, the processors compute their respective transforms in parallel. The transforms performed on the sub-vectors $x_i$ generate a plurality of $M_1$ result sub-vectors $t_i$, each having length $M_2$, which compose a distributed result vector t of length $M_1 \times M_2$.

FIG. 6—Block Diagram of Parallel Computing System Performing the Stride Permutation FIG. 6 illustrates the performance of the stride permutation of 410 above by the parallel computing system described above with reference to FIGS. 3 and 5. As described above, each of the plurality of processors, $P_0$ 300, $P_1$ 301, ..., $P_{Np-1}$ 309 may be respectively coupled to each of the corresponding plurality of local memory mediums $K_0$ 320, $K_1$ 321, ..., $K_{Np-1}$ 329, via corresponding buses 311A–Z. Furthermore, each processor P may be coupled to interconnect switch 310 via respective link 312, enabling each processor to communicate and exchange data with each of the other processors.

As FIG. 6 shows, the result vector t (generated in 408 above) is distributed among the respective local memory mediums of each processor P in the form of result sub-vectors $t_i$. For illustration purposes, each local memory is shown containing three sub-vectors of t, although the actual number of sub-vectors in each local memory may be different.

As indicated in FIG. 6, elements of the result vector t may be collected with a stride of $M_2$ and placed into consecutively indexed locations in a second result vector u. For example, as can be seen in the first memory block $K_0$ 320, the first element of each locally stored sub-vector ($t_0$, $t_1$, and $t_2$) is collected and stored sequentially in locally stored result sub-vector $u_0$. As FIG. 6 also shows, the first element of each of the sub-vectors $t_i$ stored in the remaining local memory mediums $K_1$ 321 through $K_{NP-1}$ 329 is collected and transmitted through each processor's link (see dotted lines) through the interconnect switch 310 to $P_0$ 300, which stores the first elements in subsequent positions of the result sub-vector $u_0$. Thus, the result sub-vector $u_0$ comprises the first elements of each sub-vector $t_i$, and therefore, since there are $M_1$ sub-vectors $t_i$, there are $M_1$ elements in the result sub-vector $u_0$.

This process is performed for each of the $M_2$ elements of each sub-vector $t_i$, e.g., the second element in each sub-vector $t_i$ is collected and stored in a result sub-vector $u_1$, the third element in each sub-vector $t_i$ is collected and stored in a result sub-vector $u_2$, and so on, until the $M_1$ sub-vectors (each of length $M_2$) of the distributed vector t have been transformed into $M_2$ sub-vectors (each of length $M_1$) of the distributed result vector u. As mentioned above, this stride permutation is equivalent to a matrix transposition of an $M_1 \times M_2$ matrix to an $M_2 \times M_1$ matrix, wherein the columns of the $M_1 \times M_2$ matrix become rows in the $M_2 \times M_1$ matrix (and vice versa).

FIG. 7—Diagram of Parallel Computation of the Hadamard Transform

FIG. 7 is a diagram of the Hadamard transform process described above with reference to FIG. 4 in terms of the vectors/signals. As FIG. 7 shows, input vector x 702 comprises five sub-vectors, each of length three. Thus, in the terms presented above, $M_1=5$, and $M_2=3$. It should be noted that these values are for illustration purposes only, and that the actual number of elements in a vector and/or its sub-vectors may be different. As may be seen in FIG. 7, parallel Hadamard transforms 703 of order $M_2$ may be performed on each sub-vector $x_i$ of vector x 702, producing vector t 704. This concludes stage one of the process, as described above with reference to FIG. 4.

In stage two, a stride permutation 705 with stride $M_2$ may be performed on vector t 704 to generate vector u 706. Note that only the first stride series is shown, i.e., the first element of each sub-vector $t_j$ is collected to form the first sub-vector of vector u 706, $u_0$ 7060. The second element of each sub-vector $t_j$ is collected to form the second sub-vector of vector u 706, and so on, for the remainder of elements, until vector u is complete. Note that while vector t 704 has five sub-vectors, each of length three, vector u 706 has three sub-vectors, each of length five.

As FIG. 7 shows, in stage three, parallel Hadamard transforms 707 of order $M_1$ may be performed on each sub-vector $u_j$ of vector u 706, producing vector v 708. As mentioned above, if the order of the values in the final transform result is unimportant, then the process may be stopped at this point, i.e., the vector v 708 contains all of the values of the final transform results, but the order of the values may not be correct.

Finally, in stage four, a stride permutation 709 with stride $M_1$ may be performed on vector v 706 to generate vector w 710. Note that, again, only the first stride series is shown, i.e., the first element of each sub-vector $v_j$ is collected to form the first sub-vector of vector w 710, $w_0$ 7100. The second, third, etc., elements may be similarly collected to form the respective second, third, etc., sub-vectors of w 710. Note that while vector v 708 has three sub-vectors, each of length five, vector w 710 has five sub-vectors, each of length three, as does the original input vector x 702. Vector w 710 comprises the unordered Hadamard transform of the input vector x 702. The unordered Hadamard transform w 710 of the signal x 702 may then be used in analyzing the signal x 702, or in producing other related transforms, as noted previously.

As also mentioned above, the stride permutations may be interpreted as matrix transpositions, converting an $M_1 \times M_2$ matrix to an $M_2 \times M_1$ matrix, and vice versa. This interpretation allows standard efficient parallel methods of computation to be applied to these stages (matrix transposition) of the process.

Memory and Carrier Medium

As mentioned above, the computing system preferably includes a plurality of memory mediums on which software according to an embodiment of the present invention may be stored. The memory mediums may store the input signal x, the final transformed result w, as well as various intermediate result vectors (t, u, and v) computed in the process. The memory mediums may also store a software program (or a plurality of software programs) for executing the method described above with reference to FIG. 4. One or more of the memory mediums may further store one or more software programs for analyzing the input signal x and the final result vector w.

The term "memory medium" is intended to include an installation medium, e.g., a CD-ROM, floppy disks, or tape device; a computer system memory or random access memory (RAM) such as DRAM, SRAM, EDO RAM, RRAM, etc.; or a non-volatile memory such as a magnetic media, e.g., a hard drive, or optical storage. The memory medium may comprise other types of memory as well, or combinations thereof.

In addition, the memory mediums may be located in one or more first computers in which the one or more software programs are stored or executed, and/or may be located in one or more second different computers which connect to the first computers over a network, such as the Internet. In the latter instance, the second computers provide the program instructions to the first computers for execution. The memory mediums thus may be distributed across a plurality of computers 102. Also, the computing system may take various forms, including one or more personal computer systems, mainframe computer systems, workstations, network appliances, Internet appliances, personal digital assistants (PDA), television set-top boxes, or other devices. In general, the term "computing system" can be broadly defined to encompass any device having at least one processor which executes instructions from a memory medium, or any device which includes programmable logic that is configurable to perform a method or algorithm.

Various embodiments further include receiving or storing instructions and/or data implemented in accordance with the foregoing description upon a carrier medium. Suitable carrier media include a memory medium as described above, as well as signals such as electrical, electromagnetic, or digital signals, conveyed via a communication medium such as networks and/or a wireless link.

In one embodiment, the software programs as described herein may be designed for use in telecommunication systems, including systems which perform filtering, analysis, and/or display, or for use in various cryptographic systems. In another embodiment, the software programs may be designed for use in imaging systems. In other embodiments, the software programs may be designed for use in business, financial, scientific, biometric, or medical analysis, among others.

However, it is noted that the present invention can be used for a plethora of applications and is not limited to the applications shown herein. In other words, the applications described herein are exemplary only, and the methods described herein may be used for any of various purposes and may be stored in and execute on any of various types of systems to perform any of various applications.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A system for performing parallel computation of a Hadamard transform on a signal x, the system comprising:
   a plurality of interconnected processors;
   a plurality of memory mediums, wherein each of the memory mediums is coupled to a corresponding one of the plurality of interconnected processors;
   an input for receiving the signal x;
   wherein the plurality of interconnected processors are each operable to execute at least one Hadamard transform on respective portions of the signal x, thereby producing respective Hadamard transform result portions, and wherein the plurality of interconnected processors are operable to process in a parallel fashion to produce said respective Hadamard transform result portions;

wherein the plurality of interconnected processors are operable to generate the Hadamard transform of the signal x based on the respective Hadamard transform result portions; and wherein the Hadamard transform of the signal x is useable in analyzing the signal x.

2. The system of claim 1, wherein each of the plurality of memory mediums stores at least a portion of a parallel Hadamard transform software program; and wherein each of the plurality of interconnected processors is operable to execute a respective portion of the Hadamard transform software program to compute the Hadamard transform of the signal x, and wherein the plurality of interconnected processors are operable to process in a parallel fashion to produce said Hadamard transform of the signal x.

3. The system of claim 1, wherein one or more of the plurality of memory mediums stores the Hadamard transform of the signal x.

4. The system of claim 1, wherein at least one of the processors is operable to combine the respective Hadamard transform result portions produced by each of the processors to compute the Hadamard transform of the signal x.

5. The system of claim 1, wherein each of the plurality of interconnected processors is operable to calculate a respective portion of the Hadamard transform for a portion of the input signal x.

6. The system of claim 1, wherein each Hadamard result portion of the respective Hadamard transform result portions is computed in a plurality of stages.

7. The system of claim 6, wherein the signal x is a vector having length M, wherein $M=M_1 \cdot M_2$, wherein the signal x comprises a plurality $M_1$ of sub-vectors each having length $M_2$;

wherein, in a first stage:
the plurality of interconnected processors are each operable to execute at least a portion of the Hadamard transform on a respective at least one sub-vector, wherein the plurality of processors thereby generate a first result vector u comprising a plurality $M_2$ of first result sub-vectors each having length $M_1$, and wherein the plurality of interconnected processors are operable to process in a parallel fashion to generate the first result vector u comprising the plurality $M_2$ of the first result sub-vectors;

wherein, in a second stage:
the plurality of interconnected processors are each operable to execute at least a portion of the Hadamard transform on a respective at least one first result sub-vector, wherein the plurality of processors thereby generate a second result vector w comprising a plurality $M_1$ of second result sub-vectors each having length $M_2$, and wherein the plurality of interconnected processors are operable to process in a parallel fashion to generate the second result vector w comprising the plurality $M_1$ of the second result sub-vectors;

wherein said second result vector w comprises the Hadamard transform of the signal x.

8. The system of claim 6, wherein, in said executing at least a portion of the Hadamard transform on a respective at least one sub-vector, each processor of the plurality of interconnected processors is operable to:
perform the at least one Hadamard transform on the respective at least one sub-vector; and
collect respective corresponding elements of each Hadamard transformed sub-vector to generate at least one first result sub-vector.

9. The system of claim 6, wherein, in said executing at least a portion of the Hadamard transform on a respective at least one first result sub-vector, each processor of the plurality of interconnected processors is operable to:
perform the at least one Hadamard transform on the respective at least one first result sub-vector, thereby generating at least one Hadamard transformed first result sub-vector;
collect respective corresponding elements of each Hadamard transformed first result sub-vector to generate at least one second result sub-vector.

10. A system for performing parallel computation of a Hadamard transform of a signal x, the system comprising:
a plurality of interconnected processors;
a plurality of memory mediums, wherein each of the memory mediums is coupled to a corresponding one of the plurality of interconnected processors;
an input for receiving the signal x;
wherein each of the plurality of memory mediums stores at least a respective portion of a parallel Hadamard transform software program for execution by the corresponding one of the plurality of interconnected processors;
wherein each of the plurality of interconnected processors is operable to execute said respective said-portions portion of the parallel Hadamard transform software program to compute the Hadamard transform of the signal x, and wherein the plurality of interconnected processors are operable to process in a parallel fashion to produce said Hadamard transform of the signal x, thereby producing a Hadamard transform result; and
wherein the Hadamard transform result is useable in analyzing the signal x.

11. The system of claim 10, wherein the parallel Hadamard transform software program includes a plurality of stages to compute the Hadamard transform of the signal x.

12. The system of claim 10, wherein said plurality of stages comprises:
a first stage, wherein:
the signal x is partitioned into a first plurality of $M_1$ ordered sub-vectors, each of length $M_2$;
the first plurality of $M_1$ ordered sub-vectors are distributed among the plurality of memory mediums;
a Hadamard transform of order $M_2$ ($H_{M2}$) is performed on each of the first plurality of M1 ordered sub-vectors to generate a second plurality of $M_1$ ordered sub-vectors, each of length $M_2$, wherein each of the plurality of interconnected processors is operable to perform the $H_{M2}$ on at least one of the first plurality of $M_1$ ordered sub-vectors;
a second stage, wherein:
the second plurality of $M_1$ ordered sub-vectors, each of length $M_2$, is considered as a first matrix of size $M_2 \times M_1$, and a first global matrix transposition is performed on the first matrix to generate a second matrix of size $M_1 \times M_2$, wherein said first matrix and said second matrix are distributed matrices, wherein said first global matrix transposition is performed in parallel by the plurality of interconnected processors, and wherein said second matrix comprises a third plurality of $M_2$ ordered sub-vectors, each of length $M_1$; and a third stage, wherein:
  a Hadamard transform of order $M_1$ ($H_{M1}$) is performed on each of the third plurality of $M_2$ ordered sub-vectors to generate a fourth plurality of $M_2$ ordered sub-vectors, each of length $M_1$, wherein each of the plurality of interconnected processors is operable to perform the $H_{M1}$ on at least one of the fourth plurality of $M_2$ ordered sub-vectors; and
  wherein values of the fourth plurality of $M_2$ ordered sub-vectors comprise unordered values of the Hadamard transform of the signal x.

13. The system of claim 12, wherein said plurality of stages further comprises:
  a fourth stage, wherein:
    the fourth plurality of $M_2$ ordered sub-vectors, each of length $M_1$, is considered as a third matrix of size $M_1 \times M_2$, and a second global matrix transposition is performed on the third matrix to generate a fourth matrix of size $M_2 \times M_1$, wherein said third matrix and said fourth matrix are distributed matrices, and wherein said second global matrix transposition is performed in parallel by the plurality of interconnected processors, wherein the fourth matrix comprises a fifth plurality of $M_1$ ordered sub-vectors, each of length $M_2$, and wherein said fifth plurality of $M_1$ ordered sub-vectors comprises a transformed vector of size $M_1 \times M_2$, and wherein said transformed vector comprises the Hadamard transform of the signal x.

14. The system of claim 10, wherein the Hadamard transform is an unordered Hadamard transform.

15. A system for performing parallel computation of a Hadamard transform of a signal x, the system comprising:
  a plurality of interconnected processors;
  a plurality of memory mediums, wherein each of the memory mediums is coupled to a corresponding one of the plurality of interconnected processors;
  an input for receiving the signal x;
  wherein each of the plurality of memory mediums stores at least a respective portion of a parallel Hadamard transform software program for execution by the corresponding one of the plurality of interconnected processors;
  wherein each of the plurality of memory mediums stores at least a portion of the signal x;
  wherein each of the plurality of interconnected processors is operable to execute said respective portion of the parallel Hadamard transform software program to compute the Hadamard transform of the signal x, and wherein the plurality of interconnected processors are operable to process in a parallel fashion to produce said Hadamard transform of the signal x; and
  wherein the Hadamard transform of the signal x is useable in analyzing the signal x.

16. The system of claim 15, wherein the plurality of interconnected processors are operable to execute said portions of the parallel Hadamard transform software program in parallel to:
  generate a first plurality of ordered sub-vectors from the signal x;
  perform a Hadamard transform on each of the first plurality of ordered sub-vectors to generate a second plurality of ordered sub-vectors, wherein the second plurality of ordered sub-vectors composes an intermediate vector; and
  perform a stride permutation on the intermediate vector to generate a result vector comprising a third plurality of ordered sub-vectors.

17. The system of claim 16,
  wherein the signal x has length $M_1 \cdot M_2$;
  wherein said generating a first plurality of ordered sub-vectors from the signal x comprises partitioning the signal x into a first plurality of $M_1$ ordered sub-vectors, each of length $M_2$;
  wherein said result vector comprises a second intermediate vector;
  wherein the plurality of interconnected processors are further operable to execute said portions of the parallel Hadamard transform software program in parallel to:
    perform a Hadamard transform on each of the third plurality of ordered sub-vectors to generate a fourth plurality of ordered sub-vectors, wherein the fourth plurality of ordered sub-vectors composes a third intermediate vector,
  wherein values of the third intermediate vector are useable in analyzing the signal x.

18. The system of claim 17, wherein the plurality of interconnected processors are further operable to execute said portions of the parallel Hadamard transform software program in parallel to:
  perform a stride permutation on the third intermediate vector to generate a second result vector, wherein the second result vector comprises the Hadamard transform of the signal x.

19. The system of claim 16,
  wherein the signal x has length $M_1 \cdot M_2$;
  wherein in said generating a first plurality of ordered sub-vectors from the signal x, the plurality of interconnected processors are operable to:
    partition the signal x into a plurality of $M_1$ ordered sub-vectors, each of length $M_2$;
    distribute the plurality of $M_1$ ordered sub-vectors among the plurality of memory mediums;
    perform a Hadamard transform of order $M_2$ ($H_{M2}$) on each of the plurality of M1 ordered sub-vectors to generate a fourth plurality of $M_1$ ordered sub-vectors, each of length $M_2$, wherein the fourth plurality of $M_1$ ordered sub-vectors composes an intermediate vector, and wherein each of the plurality of interconnected processors is operable to perform the $H_{M2}$ on at least one of the plurality of $M_1$ ordered sub-vectors; and
    perform a stride permutation of stride $M_2$ on the intermediate vector to generate the first plurality ordered sub-vectors, comprising $M_2$ ordered sub-vectors, each of length M1;
  wherein the result vector comprising the third plurality of ordered sub-vectors is the Hadamard transform of the signal x.

20. The system of claim 15, wherein the Hadamard transform is an unordered Hadamard transform.

21. A method for performing parallel computation of a Hadamard transform, wherein the method operates in a system comprising a plurality of interconnected processors and a corresponding plurality of memory mediums, the method comprising:

receiving an input signal x;

each of the processors computing a portion of the Hadamard transform on the input signal x in parallel, wherein each of the processors generates a Hadamard transform result portion; and generating the Hadamard transform of the signal x based on the Hadamard transform result portions from each of the processors;

wherein the Hadamard transform of the signal x is useable in analyzing the signal x.

22. The method of claim 21, further comprising:

storing the Hadamard transform of the signal x.

23. The method of claim 21, wherein each of the processors computing a portion of the Hadamard transform on the input signal x in parallel comprises each of the processors storing its respective Hadamard transform result portion in a local memory of the respective processor.

24. The method of claim 21, wherein each of the processors computing a portion of the Hadamard transform on the input signal x in parallel comprises:

partitioning the signal x is into a first plurality of $M_1$ ordered sub-vectors, each of length $M_2$;

distributing the first plurality of $M_1$ ordered sub-vectors among the plurality of memory mediums; and performing a Hadamard transform of order $M_2$ ($H_{M2}$) on each of the plurality of $M_1$ ordered sub-vectors to generate a second plurality of $M_1$ ordered sub-vectors, each of length $M_2$, wherein each of the plurality of interconnected processors performs the $H_{M2}$ on at least one of the sub-vectors.

25. The method of claim 24, wherein each of the processors computing a portion of the Hadamard transform on the input signal x in parallel further comprises:

considering the second plurality of $M_1$ ordered sub-vectors, each of length $M_2$, as a first matrix of size $M_2 \times M_1$, and performing a first global matrix transposition on the first matrix to generate a second matrix of size $M_1 \times M_2$, wherein the first matrix and the second matrix are distributed matrices, and wherein the first global matrix transposition is performed in parallel by the plurality of interconnected processors, wherein the second matrix comprises a third plurality of $M_2$ ordered sub-vectors, each of length $M_1$.

26. The method of claim 25, wherein each of the processors computing a portion of the Hadamard transform on the input signal x in parallel further comprises:

performing a Hadamard transform of order $M_1$ ($H_{M1}$) on each of the third plurality of $M_2$ ordered sub-vectors to generate a fourth plurality of $M_2$ ordered sub-vectors, each of length $M_1$, wherein each of the plurality of interconnected processors performs the $H_{M1}$ on at least one of the fourth plurality of $M_2$ ordered sub-vectors; and wherein values of the fourth plurality of $M_2$ ordered sub-vectors comprise unordered values of the Hadamard transform of the signal x.

27. The method of claim 26, wherein each of the processors computing a portion of the Hadamard transform on the input signal x in parallel further comprises:

considering the fourth plurality of $M_2$ ordered sub-vectors, each of length $M_1$, as a third matrix of size $M_1 \times M_2$, and performing a second global matrix transposition on the third matrix to generate a fourth matrix of size $M_2 \times M_1$, wherein said third matrix and said fourth matrix are distributed matrices, and wherein said second global matrix transposition is performed in parallel by the plurality of interconnected processors, wherein the fourth matrix comprises a fifth plurality of $M_1$ ordered sub-vectors, each of length $M_2$, wherein said fifth plurality of $M_1$ ordered sub-vectors comprises a transformed vector of size ($M_1 \times M_2$), and wherein said transformed vector comprises the Hadamard transform of the signal x.

28. The method of claim 21, wherein the Hadamard transform is an unordered Hadamard transform.

29. The method of claim 21, wherein the Hadamard transform is used to compute one of: a Walsh transform and a Walsh-Hadamard transform.

30. The method of claim 21, wherein the Hadamard transform is an unordered Hadamard transform, and wherein the Hadamard transform is used to compute an ordered Hadamard transform.

31. A memory medium comprising program instructions for performing parallel computation of a Hadamard transform, wherein the memory medium is comprised in a system comprising a plurality of interconnected processors, where said program instructions are executable to perform:

receiving an input signal x;

each of the processors computing a portion of the Hadamard transform on the input signal x in parallel, wherein each of the processors generates a Hadamard transform result portion; and generating the Hadamard transform of the signal x based on the Hadamard transform result portions from each of the processors;

wherein the Hadamard transform of the signal x is useable in analyzing the signal x.

32. The memory medium of claim 31, wherein said program instructions are further executable to perform:

storing the Hadamard transform of the signal x.

33. The memory medium of claim 31, wherein the memory medium is a distributed memory medium, and wherein the memory medium comprises a plurality of local memory mediums corresponding to each of the plurality of interconnected processors.

34. The memory medium of claim 31, wherein each of the processors computing a portion of the Hadamard transform on the input signal x in parallel comprises each of the processors storing its respective Hadamard transform result portion in a local memory of the respective processor.

35. The memory medium of claim 31, wherein the memory medium is a distributed memory medium, and wherein the memory medium comprises a plurality of local memory mediums corresponding to each of the plurality of interconnected processors;

wherein each of the processors computing a portion of the Hadamard transform on the input signal x in parallel comprises:

partitioning the signal x is into a first plurality of $M_1$ ordered sub-vectors, each of length $M_2$;

distributing the first plurality of $M_1$ ordered sub-vectors among the plurality of memory mediums; and performing a Hadamard transform of order $M_2$ ($H_{M2}$) on each of the plurality of $M_1$ ordered sub-vectors to generate a second plurality of $M_1$ ordered sub-vectors, each of length $M_2$, wherein each of the plurality of interconnected processors performs the $H_{M2}$ on at least one of the sub-vectors.

36. The memory medium of claim 35, wherein each of the processors computing a portion of the Hadamard transform on the input signal x in parallel further comprises:

considering the second plurality of $M_1$ ordered sub-vectors, each of length $M_2$, as a first matrix of size $M_2 \times M_1$, and performing a first global matrix transposition on the first matrix to generate a second matrix of size $M_1 \times M_2$, wherein the first matrix and the second matrix are distributed matrices, and wherein the first global matrix transposition is performed in parallel by the plurality of interconnected processors, wherein the second matrix comprises a third plurality of $M_2$ ordered sub-vectors, each of length $M_1$.

37. The memory medium of claim 36, wherein each of the processors computing a portion of the Hadamard transform on the input signal x in parallel further comprises:

performing a Hadamard transform of order $M_1$ ($H_{M1}$) on each of the third plurality of $M_2$ ordered sub-vectors to generate a fourth plurality of $M_2$ ordered sub-vectors, each of length $M_1$, wherein each of the plurality of interconnected processors performs the $H_{M1}$ on at least one of the fourth plurality of $M_2$ ordered sub-vectors; and wherein values of the fourth plurality of $M_2$ ordered sub-vectors comprise unordered values of the Hadamard transform of the signal x.

38. The memory medium of claim 37, wherein each of the processors computing a portion of the Hadamard transform on the input signal x in parallel further comprises:

considering the fourth plurality of $M_2$ ordered sub-vectors, each of length $M_1$, as a third matrix of size $M_1 \times M_2$, and performing a second global matrix transposition on the third matrix to generate a fourth matrix of size $M_2 \times M_1$, wherein said third matrix and said fourth matrix are distributed matrices, and wherein said second global matrix transposition is performed in parallel by the plurality of interconnected processors, wherein the fourth matrix comprises a fifth plurality of $M_1$ ordered sub-vectors, each of length $M_2$, wherein said fifth plurality of $M_1$ ordered sub-vectors comprises a transformed vector of size ($M_1 \times M_2$), and wherein said transformed vector comprises the Hadamard transform of the signal x.

39. The memory medium of claim 31, wherein the Hadamard transform is an unordered Hadamard transform.

40. The memory medium of claim 31, wherein the Hadamard transform is an unordered Hadamard transform, and wherein the Hadamard transform is used to compute one of: an ordered Hadamard transform, a Walsh transform, and a Walsh-Hadamard transform.

41. A system for performing parallel computation of a Hadamard transform on a signal x, the system comprising:

a plurality of interconnected processors;

a plurality of memory mediums, wherein each of the memory mediums is coupled to a corresponding one of the plurality of interconnected processors; and an input for receiving the signal x;

wherein the plurality of interconnected processors are each operable to execute at least one Hadamard transform on one or more respective sub-vectors of the signal x, thereby producing a plurality of first sub-vectors $t_i$, comprising a vector t, and wherein the plurality of interconnected processors are operable to process in a parallel fashion to produce the plurality of first sub-vectors $t_i$;

wherein the plurality of interconnected processors are operable to permute data from the plurality of first sub-vectors $t_i$ to generate a plurality of second sub-vectors $u_j$, comprising a vector u;

wherein the plurality of interconnected processors are each operable to execute at least one Hadamard transform on sub-vectors $u_j$, thereby producing a plurality of third sub-vectors $v_j$, comprising a vector v, and wherein the plurality of interconnected processors are operable to process in a parallel fashion to produce the plurality of third sub-vectors $v_j$; and wherein values of said vector v comprise unordered values of the Hadamard transform of signal x.

42. The system of claim 41, wherein the plurality of interconnected processors are further operable to permute data from the plurality of third sub-vectors $v_j$ to generate a plurality of fourth sub-vectors $w_i$, comprising a transform vector w;

wherein the transform vector w comprises the Hadamard transform of the signal x; and wherein the Hadamard transform of the signal x is useable in analyzing the signal x.

43. The system of claim 42, wherein said vector v is of length $M_1 M_2$; and wherein said permuting data from the plurality of first sub-vectors $t_j$ comprises performing a stride permutation of elements of vector v, with a stride of $M_1$, and collecting the permuted elements into the respective sub-vectors $w_i$.

44. The system of claim 41, wherein said plurality of first sub-vectors $t_i$ comprises a vector t of length $M_1 M_2$; and wherein said permuting data from the plurality of first sub-vectors $t_i$ comprises performing a stride permutation of elements of vector t, with a stride of $M_2$, and collecting the permuted elements into the respective sub-vectors $u_j$.

45. The system of claim 41, wherein the Hadamard transform is an unordered Hadamard transform.

46. The system of claim 41, wherein the Hadamard transform is an unordered Hadamard transform, and wherein the Hadamard transform is used to compute one of: an ordered Hadamard transform, a Walsh transform, and a Walsh-Hadamard transform.

* * * * *